United States Patent

Albareda et al.

[11] 4,052,246
[45] Oct. 4, 1977

[54] STITCHER FOR TIRE BUILDING

[75] Inventors: Angel Ramon Terrado Albareda, Mersch; Joseph Schoellen, Ettelbruck, both of Luxembourg

[73] Assignee: The Goodyear Tire & Rubber Company, Akron, Ohio

[21] Appl. No.: 671,795

[22] Filed: Mar. 30, 1976

[51] Int. Cl.² .......................................... B29H 17/08
[52] U.S. Cl. .................................. 156/412; 156/121
[58] Field of Search ............ 156/407, 408, 409, 410, 156/411, 412, 413, 421, 122, 157, 488, 502, 503; 241/295; 425/365, 374; 144/250 A

[56] References Cited

U.S. PATENT DOCUMENTS

| 1,834,559 | 12/1931 | Waner | 156/412 |
|---|---|---|---|
| 1,869,317 | 7/1932 | Stevens | 156/412 |
| 1,970,780 | 8/1934 | Stevens | 156/408 |
| 2,381,383 | 8/1945 | Steinel | 156/122 |
| 2,556,305 | 6/1951 | Vickers | 156/122 |
| 2,600,291 | 6/1952 | Engler | 156/412 |
| 2,614,952 | 10/1952 | Kraft | 156/130 |
| 2,838,091 | 6/1958 | Kraft | 156/413 |
| 2,955,640 | 10/1960 | Barns | 156/502 |

*Primary Examiner*—Charles E. Van Horn
*Assistant Examiner*—John E. Kittle
*Attorney, Agent, or Firm*—F. W. Brunner; R. S. Washburn

[57] ABSTRACT

Stitchers for consolidating tire building components successively wrapped on a building drum comprise multiple thin or narrow annular discs in side-by-side array. Each is free independently and individually to rotate about an axis common to the discs in response to the rotation of the building drum, and to be displaced normal to such axis by differing radial elevation of the components relative to the surface of the drum. Uniformly distributed pressure of the discs on the components along the contact zone is obtained by an inflatable cushion extending through the discs and acting on them individually. Thin inner plates disposed respectively within each disc rotatably support the discs and transfer the stitching forces from the cushion to individual discs.

11 Claims, 10 Drawing Figures

STITCHER FOR TIRE BUILDING

The foregoing abstract is not to be taken as limiting the invention of this application, and in order to understand the full nature and extent of the technical disclosure of this application, reference must be made to the accompanying drawing and the following detailed description.

The present invention relates to tire building and particularly to a novel and useful stitcher for use in building tires.

In the arts of tire building, stitching is an essential operation performed in many different ways with differing instrumentalities all of which are directed to the purpose of eliminating air and other gasses from between the building elements successively applied in building up a tire assembly. Stitching is employed to promote the adherence of successive elements of the lamination.

The principal objects of the present invention are to provide a stitcher capable of conforming closely to differing elevations of a section profile of a plurality of tire components with respect to the tire building surface on which the components are applied; a stitcher able to eliminate air from between tire building elements, a stitcher which is capable of applying stitching pressures uniformly distributed over the length of contact between the stitcher and the tire elements being stitched; and a stitcher which exerts a minimum of force tangent to the surface of the tire elements being stitched.

The objects and advantages of the invention are, broadly, accomplished by a multiple disc stitcher for use in building tires comprising a pair of end members spaced apart and disposed in parallel opposed relation to each other, a multiplicity of outer discs of concentric annular form and small thickness is side-by-side array between the end members, each disc being slidable relative to a respectively adjacent disc, support means providing beam support to said discs disposed within said discs and extending normal to the discs between the end members, and a resilient and fluid pressure containing cushion disposed within the outer discs between the end members and cooperable with the support means and the discs to control displacement of the discs relative to the support means. The stitcher may further comprise a multiplicity of inner plate members each having an arcuate outer surface slidably engaged with a respectively associated one of the discs and small thickness corresponding to the thickness of the associated outer disc, the plate members each having an opening thereto accommodating the fluid pressure containing cushion.

To acquaint persons skilled in the art more completely with the principles of the invention, preferred embodiments of the invention illustrating the best mode of practice thereof are described hereinafter making reference to the attached drawings which are a part of the disclosure hereof and in which drawings.

Figure 2:
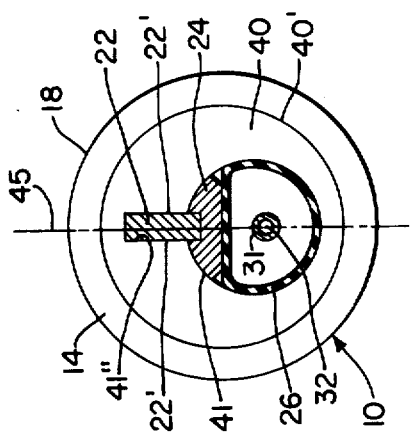
FIGS. 1 and 2 are respectively a longitudinal sectional elevation view and a transverse cross-section view of a stitcher in accordance with the invention.
Figure 4:
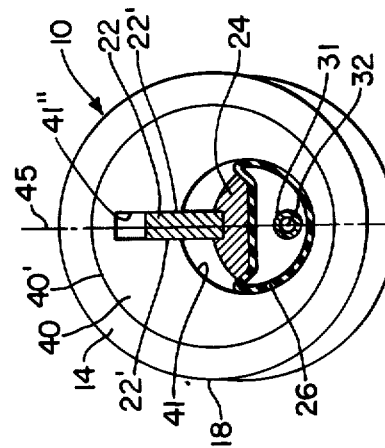
FIGS. 3 and 4 are respectively an elevation and a transverse section view of the stitcher of FIG. 1 illustrating schematically the operation of one embodiment of the invention.

Considering first the embodiment illustrated in FIGS. 1–4, the stitcher 10 comprises a pair of end assemblies 12 which are spaced apart and disposed in parallel opposed relation to each other.

A multiplicity of outer discs 14 of concentric annular form and small thickness are arranged in side-by-side cylindrical array extending longitudinally of the stitcher between the end assemblies. Each end assembly 12 includes an end ring 16 having a plane face 16' normal to the length of the stitcher and so spaced apart longitudinally as to permit the immediately adjacent discs to rotate relative to the end rings as well as permit each disc to rotate relatively adjacent discs. The outer circumference of the respective discs cooperate to provide a working surface 18 engageable with tire building components carried by the tire building surface 20. The small thickness referred to can be selected in accordance with conventional criteria from a practical minimum of about 2 millimeters to as much as about 10 millimeters. Preferably, this thickness will range from about 4 to about 8 millimeters. In the embodiment being described, a thickness of about 4 millimeters has been found satisfactory. The spacing between the faces 16' at a minimum must allow the respective discs 14 freedom to rotate relatively of one another as well as to slide parallel to one another and at its maximum is to retain the respective discs in a mutually supporting array in which the respective discs are normal to the length of the stitcher.

To provide beam support to the individual discs, support means is provided by a longitudinal beam 22 extending through the multiplicity of discs from one to the other of the end assemblies to which it is secured. An elongated pressure bar 24 extends longitudinally of the beam in contact therewith and, to increase the stiffness of the beam, can be joined integrally therewith.

To distribute stitching pressure uniformly along the array of discs, a resilient and fluid pressure containing cushion is disposed within the discs to extend between the end assemblies and cooperates with the pressure bar 24 and beam 22 to control the displacement of the discs 14 relative to the beam. In the stitcher 10 the cushion comprises an inflatable tube 26 of rubbery material extending between the end assemblies and having a transverse section best described by reference to FIG. 2, when in its undeflected state. The ends 26' of the tube are turned inwardly and are retained between the surface 28' of the end cap 28 and the fitting 29 which is provided with a peripheral shape conjugate with the tube as illustrated in FIG. 2. The fittings are secured airtightly to the hollow rod 31 which extends longitudinally within the cushion tube 26 and outwardly of the fittings through the end caps 28. The rod 31 provides a passage 32 for fluid, such as air under pressure, communicating with the interior of the cushion by way of a port 33, the passage being connected to a fluid pressure supply (not shown) by the line 35 in which is disposed a pressure regulator 37 operable to control the fluid pressure in the cushion.

In a particularly advantageous aspect of the invention the individual discs 14 are supported for rotation about the support means without sliding contact between the discs and the cushion by a multiplicity of inner plate members 40 each of which has an arcuate outer surface 40' slidingly supporting the respectively associated one of the discs. The plate members are of small thickness corresponding to and preferably equal to the thickness of respectively associated outer discs. In the stitcher 10 the inner plate members each have a circular outer periphery which supports the respectively associated disc for rotation freely relative to the plate member 40. Each of the plate members has an opening 41 therethrough which accommodates the fluid pressure cushion tube 26 as well as the pressure bar 24 in the manner best described again by reference to FIG. 2. The opening through each plate member is extended to accommodate the rectangular cross-section of the beam 22 the longer sides 22' of which extend parallel to the diameter of the outer discs in the plane 45 in which the deflection of the discs relative to the beam occurs during operation. The longer sides 22' of the beam provide a planar guide surface parallel to the deflection plane 45 and normal to the length of the beam 22 while the extended portion of the opening through the inner plate member provides surfaces 41' which are in slidable contact with the sides 22' and control thereby the movement or oscillation of each of the inner plate members as they are individually moved to accommodate the differences in profile height of the tire elements being stitched on the tire building surface 20.

The end cap 28 of each end assembly provides a stub extension 28", or an equivalent thereof, affixed to mounting means in the form of arms 48 for disposing the stitcher 10 in operative relation with a tire building drum surface 20 and a tire carcass being built thereon. The arms are mounted swingably on a suitable stationary frame (not shown) to permit the stitcher to be moved toward and away from the surface.

Considering next the embodiment illustrated in FIGS. 5, 6, 7, and 8, the stitcher 50 includes a pair of end assemblies 52. These end assemblies 52, like the end assemblies 12, are spaced apart and disposed in parallel opposed relation to each other.

The multiple array of outer discs 54 of concentric annular form and small thickness are identical to those previously described and are similarly arranged in a side-by-side cylindrical array which extends longitudinally of the stitcher between the end assemblies, each of which includes an end ring 56 having a plane face 56' normal to the length of the stitcher and so spaced apart longitudinally as to permit the discs to rotate relative to the end rings and to permit each disc to rotate relatively of the respectively adjacent discs. The peripheries of the respective discs cooperate to provide a working surface 58 engageable with tire building components carried by the tire building surface 20.

As in the previous embodiment, the small thickness referred to can be selected in accordance with conventional criteria from a practical minimum of about 2 millimeters to as much as about 10 millimeters. Preferably, this thickness is from about 2 to about 10 millimeters, and in the embodiment of FIGS. 5 through 8, a thickness of about 4 millimeters has been found satisfactory.

The space between the faces 56' of the respective end rings is fixed to allow the discs freedom to rotate relatively of one another as well as to slide parallel to each other. The maximum spacing between the end faces is such as to retain the respective discs in a mutually supporting array in which the respective discs are normal to the length of the stitcher.

To provide beam support for the individual discs, support means is provided by a longitudinal beam 60 extending through the discs from one to the other of the end assemblies 52. The beam is generally cylindrical and is provided with a concave seat 61 extending longitudinally of the beam and which seat accommodates the pressure bar 62. The ends of the beam are turned cylindrically and are carried in cylindrical bores 64' formed in the respective end members 64. As in the previous example, the pressure bar 62 can, optionally, be made integral with the beam.

To distribute stitching pressure uniformly along the array of discs, a resilient and fluid pressure containing cushion is, again, disposed within the disc to extend between the end assemblies and cooperates with the beam to control the displacement of the discs relative to the beam. In this stitcher 50, the cushion comprises a tube 66 of rubbery material extending between the end assemblies. The transverse section of the tube, best illustrated in FIG. 6, when inflated but undeflected, is an oval, which when deflected in the manner illustrated in FIGS. 7 and 8 assumes a more nearly circular crossection.

The ends 66' of the tube taper inwardly and are retained respectively in cone-shaped cavities 68 formed in the end member 64, being secured by a ferrule 69 which is expanded by a cone 71 fixed on the hollow rod 73. The rod extends through appropriate holes in the end member 64 and provides a passage 74 including the ports 75 through which air under pressure is delivered to the tube 66 from the pressure regulator 37 in the air supply line 35. The pressure regulator, as before, is operable to control the air pressure in the cushion.

As in the stitcher 10, the individual discs 54 of the stitcher 50 are supported for rotation about the support means without sliding contact between the discs and the cushion by a multiplicity of inner plate members 80 each of which has an arcuate outer surface 80' slidingly supporting the respectively associated one of the discs. The plate members are of small thickness corresponding to, each being, preferably, equal to the thickness of the associated outer disc. In the stitcher 50, the inner plate members 80 have straight parallel edges 82 which slidingly engage respectively the fixed guide bars 84 which extend between and are secured to the respective end members 64 and control the movement of the plate members relative to the working plane 85 of the stitcher.

Figure 6:
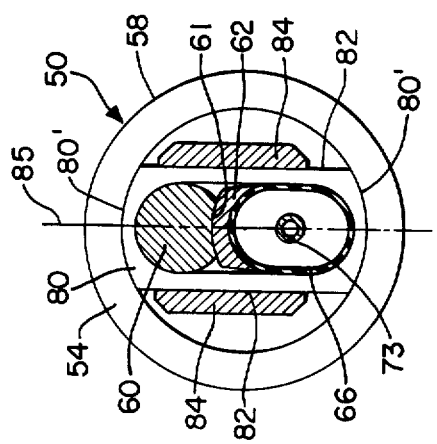
FIGS. 5 and 6 are respectively a longitudinal sectional elevation and a transverse section view of another embodiment of a stitcher in accordance with the invention.
Figure 8:
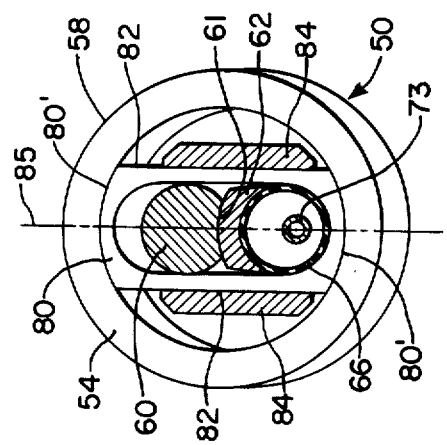
FIGS. 7 and 8 are respectively an elevation and a transverse sectional view of the stitcher of FIGS. 5 and 6 illustrating schematically the operation thereof.
Figure 5:
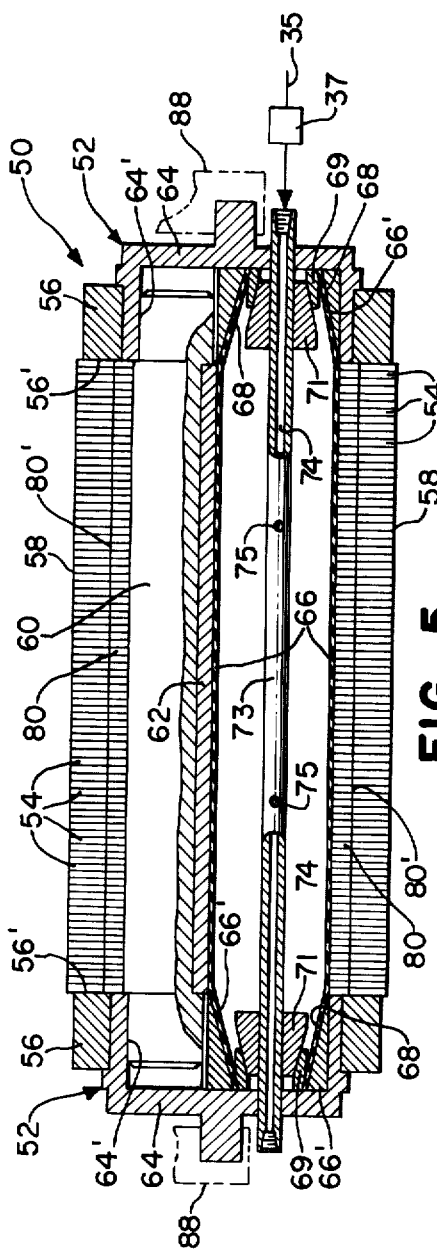

As in the previous embodiment, the plate members 80 have openings therethrough to accommodate both the beam 60 including the pressure bar and the cushion tube 66 so as to permit the movement of the respective discs as may be seen by comparing FIGS. 6 and 8.

Figure 1:
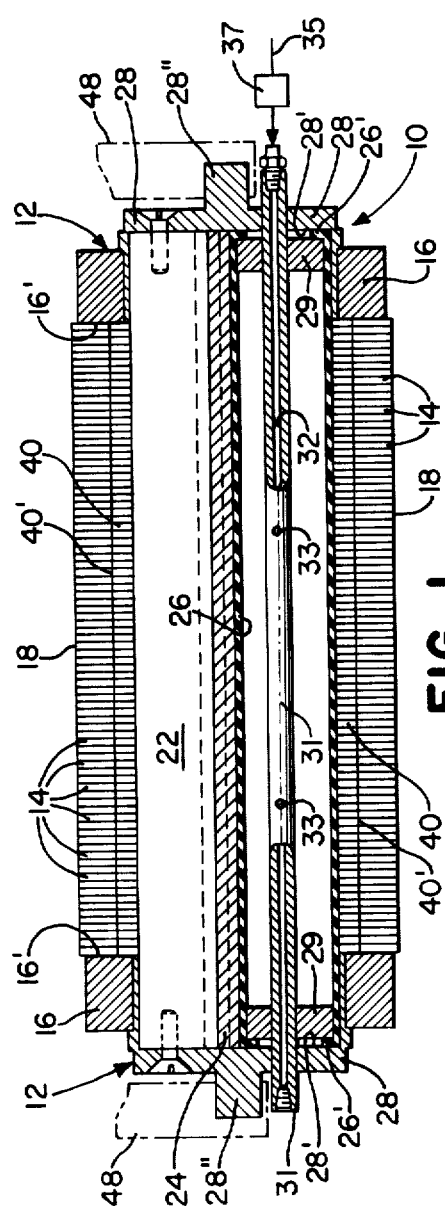

To mount the stitcher 50 in suitable operative relation with the tire building drum surface 20, the stitcher is provided with mounting means in the form of arms 88 equivalent to those described in connection with FIG. 1.

Figure 9:
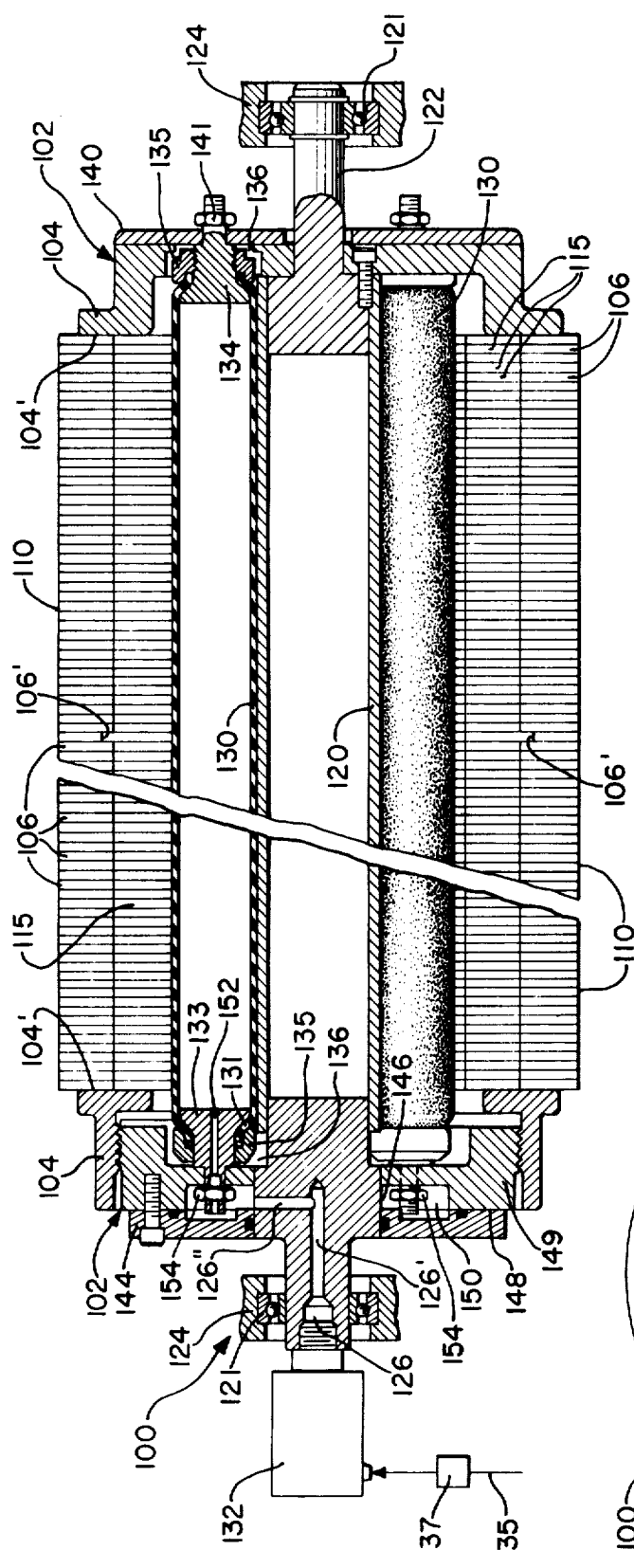
FIGS. 9 and 10 are respectively a longitudinal section view and a transverse section view of a further embodiment of a stitcher in accordance with the invention.
Figure 10:
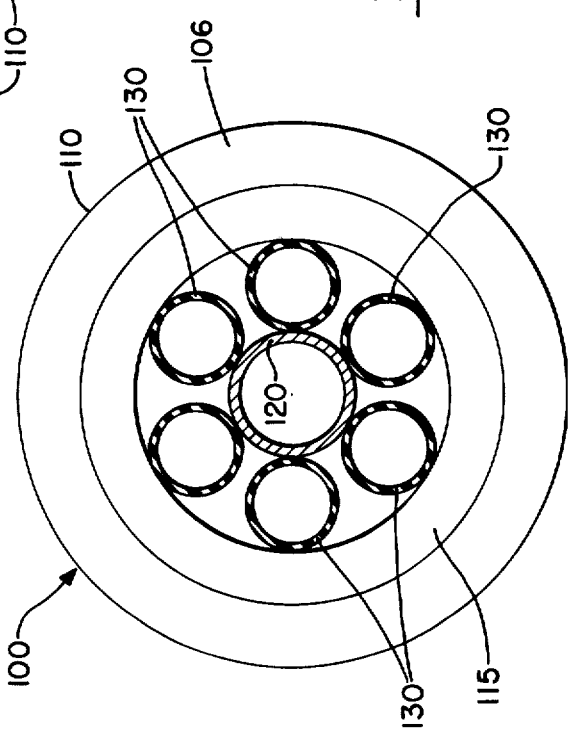

A third embodiment of the invention is illustrated in FIGS. 9 and 10. The stitcher 100 comprises a pair of end assemblies 102 including the end rings 104 which are provided with parallel opposed faces 104' spaced apart in the manner previously described in relation to FIGS. 1 and 5.

A multiplicity of outer discs 106 of concentric annular form and small thickness are arranged in side-by-side cylindrical array extending longitudinally of the stitcher between the faces of the end assemblies.

As in the other embodiments described, the outer circumferences of the respective discs cooperate to provide a generally cylindrical working surface 110 engageable with tire building components carried on the surface 20 of the tire building drum. The thickness of the disc is selected in the manner described hereinabove with respect to the embodiments of FIGS. 1 through 4 and of FIGS. 5 through 8. In the present embodiment, the inner circumference 106' of selected and spaced apart discs, for example, about one of each 50 or so discs of the stitcher is made greater in diameter than the immediately adjacent discs by approximately twice the thickness of the disc and the respectively associated inner plate members 115 are made correspondingly greater in diameter. This prevents the accumulated variance in manufacturing thickness and in working clearance between the discs from becoming large enough to permit any disc and its associated inner plate member from becoming overlapped or displaced radially with respect to one another. In the embodiment of FIGS. 9 and 10, the inner plate members 115 are concentric annular plates which slidingly support the full inner circumference of the respectively associated outer discs.

This technique, i.e. the increased inside diameter of certain discs of the stitcher, can with equal facility be applied to the diameters of certain of the discs and of the respectively associated plate members in each of the previously described embodiments.

To provide beam support for the individual discs 106, support means is provided by a longitudinal beam which in the present embodiment is a rotating shaft 120 having bearings 121 mounted on the shaft journals 122 and supported respectively in the arms 124 which are mounted in like manner to that previously described. The shaft 120 is provided with a passage 126 including a longitudinally drilled hole 126' and a radially drilled hole 126" by which air under pressure can be admitted to the cushion tubes 130. A conventional rotary joint 132 is mounted at the end of the shaft journal 122 in communication with the passage 126 and receives air from the supply line 35 by way of the regulator 37 in the manner previously described.

To distribute stitching pressure uniformly along the array of discs in the present embodiment of FIGS. 9 and 10, the resilient and fluid pressure containing cushion is provided by the plurality of longitudinally extending inflatable tubes 130, the respective ends 131 of which are accommodated in the end assemblies 102 being clamped between the respective plugs 133, 134 and the surrounding collars 135 which are fixed in recesses 136 in the end assemblies. The plugs 134, at the right end of FIG. 9, extend through a cover plate 140 and are secured by the nuts 141.

In the end assembly 102 seen at the left end of FIG. 9 the cover plate 144 is provided with sealing gaskets or O-rings one of which engages the cylindrical surface 146 of the shaft and the other the outer face 148 of the end cap 149. The arrangement provides an annular distribution chamber 150 in communication with the passage 126. The associated plugs 133 are drilled to provide passages 152 between the chamber and the interior of each of the inflatable tubes 130. A nut 154 threaded on the outward extension of each plug 133 serves to secure the plug to the end cap 149.

It will be seen that the stitcher 100 of FIGS. 9 and 10 is rotatable as an assembly about the longitudinal axis of the shaft 120 while the respective outer discs 106 are themselves free to rotate about the axis relatively and independently of the rotation of the assembly as a whole. The inner plates 115, although structurally free to rotate independently, rotate relative to the cushion tubes only to the extent that they are impelled to do so by the algebraic difference in the rotation speed existing between the rotation of the assembly as a whole and the individual rotations of the outer discs.

Figure 3:
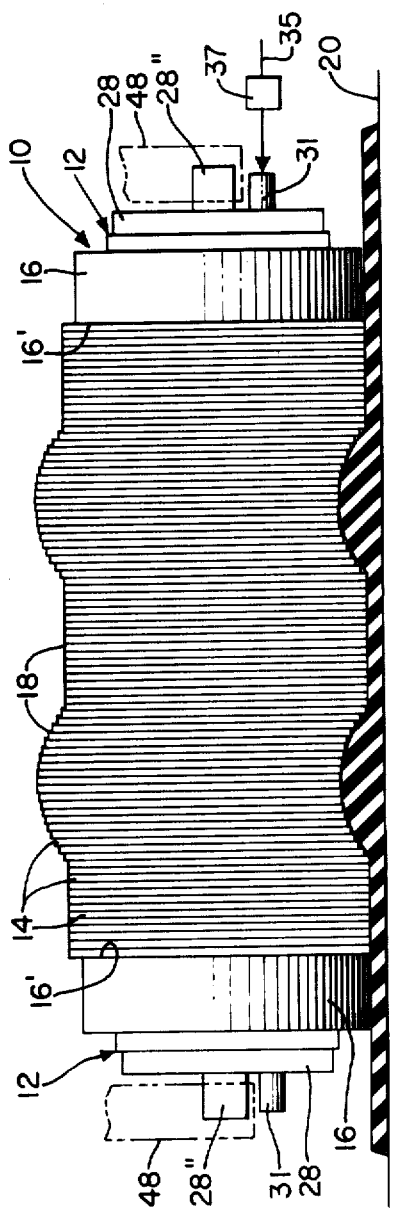
Figure 7:
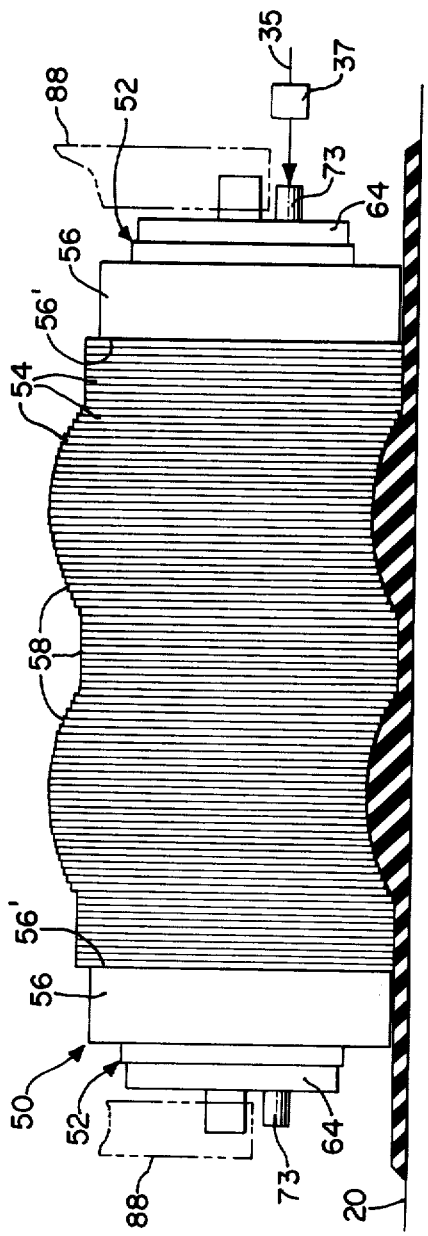

The discs 106, as in the previously described embodiments, accommodate difference in local surface speed of the material assembled on the tire building drum to differing radial elevations illustrated by the humps which may be seen in FIGS. 3 and 7. The surface speed at the diameter of the humps differs from the surface speed of the adjacent material during rotation of the building drum. In each of the foregoing embodiments, therefore, the tangential forces exerted by the stitcher on the tire building elements becomes entirely negligible and cannot disturb the arrangement of the tire building elements. Because of the freedom of the respective discs to move normal to the surface of the tire building drum and the tire building elements thereon and because of the fluid pressure cushions within the stitcher, the distribution of stitching pressure across the face of the tire building drum is very nearly uniformly distributed.

While certain representative embodiments and details have been shown for the purpose of illustrating the invention, it will be apparent to those skilled in the art that various changes and modifications may be made therein without departing from the spirit or scope of the invention.

What is claimed is:

1. A multiple disc stitcher for use in building tires comprising a pair of end assemblies spaced apart and disposed in parallel opposed relation to each other, a multiplicity of outer discs of equal exterior diameter and of concentric annular form and small thickness disposed in side-by-side array between the end members, each disc being slidable relative to the respectively adjacent disc, support means providing single continuous beam support for said discs disposed within the discs and extending normal to the discs between the end assemblies, a resilient fluid pressure containing cushion member juxtaposed to the support means and extending through the discs between the end assemblies and cooperable with the support means to control the displacement of the outer discs relative to the support means, a multiplicity of inner plate members each having an arcuate outer surface slidingly engageable with respectively associated one of said outer discs and small thickness corresponding to the thickness of the associated outer disc, said plate members each having an opening therethrough accommodating said fluid pressure containing member, said outer discs being freely rotatable relative to the support means and relative to said plate members.

2. A multiple disc stitcher as claimed in claim 1, further comprising, mounting means for disposing said support means in operative association with a tire building surface.

3. A multiple disc stitcher as claimed in claim 1, wherein said outer discs and said inner plate members are of different materials selected to provide a low coefficient of sliding friction relative to each other.

4. A multiple disc stitcher as claimed in claim 3, wherein said outer discs are of a polyacetyl and said inner plate members are of a super-polyamide.

5. A multiple disc stitcher as claimed in claim 1, wherein said fluid pressure containing member comprises an elongate tube of rubbery material having reinforcing cords extending longitudinally in the wall of said tube.

6. A multiple disc stitcher as claimed in claim 1, further comprising means connecting the fluid pressure containing member in flow communication with fluid pressure supply, and a pressure regulator operable to control the fluid pressure in said containing member.

7. A multiple disc stitcher as claimed in claim 1, wherein the support means comprises a beam of rectangular cross-section, the cross-section having its two longer sides parallel a diameter of the multiplicity of discs, each said opening having a boundary surface including a spaced apart parallel pair of guide surfaces slidably engaging the respectively associated longer sides of the beam, and a pressure bar extending longitudinally of said beam between the beam and said pressure containing member.

8. A multiple disc stitcher as claimed in claim 1, wherein the support means comprises a non-rotating beam having a guide surface in a plane normal to the length of said beam, each said inner plate member having a slide surface in slidable contact with said guide surface.

9. A multiple disc stitcher as claimed in claim 1, further comprising a pair of parallel plates disposed outwardly of and adjacent the associated plate members, each having a planar guide surface parallel to and spaced from the other thereof, each said inner plate member having a pair of slide surfaces each slidably engaging a respective one of said planar guide members.

10. A multiple disc stitcher as claimed in claim 9, further comprising a beam extending through the openings of the inner plate members, an elongated pad extending between the end members and between said beam and the pressure containing member to control the shape of the latter during expansion thereof.

11. A multiple disc stitcher as claimed in claim 2, wherein said support means comprises a cylindrical center shaft, a plurality of elastically resilient fluid pressure containing elongated tubes including said containing member extending along the center shaft and spaced angularly therearound through the openings of said plate members, and a pair of bearings each mounting one end of said center shaft for rotation in said mounting means of the shaft.

* * * * *